(12) United States Patent
Cho et al.

(10) Patent No.: US 10,311,627 B2
(45) Date of Patent: Jun. 4, 2019

(54) GRAPHICS PROCESSING APPARATUS AND METHOD OF PROCESSING GRAPHICS PIPELINE THEREOF

(71) Applicant: SAMSUNG ELECTRONICS CO., LTD., Suwon-si, Gyeonggi-Do (KR)

(72) Inventors: Yeon-gon Cho, Hwaseong-si (KR); Soo-jung Ryu, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 69 days.

(21) Appl. No.: 15/690,999

(22) Filed: Aug. 30, 2017

(65) Prior Publication Data

US 2018/0174351 A1 Jun. 21, 2018

(30) Foreign Application Priority Data

Dec. 16, 2016 (KR) ......................... 10-2016-0172880

(51) Int. Cl.
| | |
|---|---|
| *G06T 15/00* | (2011.01) |
| *G06T 15/50* | (2011.01) |
| *G06T 15/04* | (2011.01) |
| *G06T 15/80* | (2011.01) |

(52) U.S. Cl.
CPC ............ *G06T 15/005* (2013.01); *G06T 15/04* (2013.01); *G06T 15/503* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 6,525,731 B1 | 2/2003 | Suits et al. | |
| 6,771,264 B1 | 8/2004 | Duluk et al. | |
| 8,289,325 B2 | 10/2012 | Green et al. | |
| 8,605,086 B2 | 12/2013 | Everitt et al. | |
| 8,605,087 B2 | 12/2013 | Everitt et al. | |
| 9,552,667 B2 * | 1/2017 | He | |

(Continued)

FOREIGN PATENT DOCUMENTS

| | | |
|---|---|---|
| JP | 4744624 | 8/2011 |
| KR | 10-0485241 | 4/2005 |
| KR | 10-2013-0017824 | 2/2013 |

*Primary Examiner* — Zhengxi Liu
(74) *Attorney, Agent, or Firm* — F. Chau & Associates, LLC

(57) ABSTRACT

A method of processing a graphics pipeline in a graphics processing apparatus includes performing pixel shading to process pixels corresponding to an object, texturing the object, and transmitting data of a textured object to a processing path for a post-processing operation of the textured object. A graphics processing apparatus for processing a graphics pipeline includes a shading processor configured to perform pixel shading to process pixels corresponding to an object. A texturing processor is configured apply to texture the object, determine a post-processing operation mode to adjust visual effects of the textured object, and transmit data of the textured object to a processing path for the post-processing operation in accordance with the determined post-processing mode. A reorder buffer is configured to buffer data of the object in accordance with a processing order when the processing path bypasses the shading processor.

16 Claims, 9 Drawing Sheets

(56) References Cited

U.S. PATENT DOCUMENTS

| | | | |
|---|---|---|---|
| 2009/0073168 A1* | 3/2009 | Jiao | G06T 15/005 345/426 |
| 2014/0267318 A1* | 9/2014 | Lum | G06T 15/005 345/506 |
| 2015/0054843 A1 | 2/2015 | McDonald et al. | |
| 2015/0279090 A1* | 10/2015 | Keramidas | G06T 15/503 345/505 |
| 2016/0163094 A1* | 6/2016 | Surti | G06T 1/20 345/426 |

* cited by examiner

FIG. 7

| Frame Number | Drawcall Number | Gstate Number | Operation | Mode Information | | |
|---|---|---|---|---|---|---|
| N | 0 | 0 | Clear | | | |
| N | 1 | 1 | Draw triangle | mode 1 | ADD, DIV | |
| N | 2 | 2 | Draw circle | mode 2 | linear interpolation | C/Z ROP |
| N+1 | 0 | 0 | Clear | | | |
| N+1 | 1 | 1 | Draw triangle | mode 3 | linear interpolation | Frame Buffer |
| N+1 | 2 | 2 | Draw circle | mode 2 | linear interpolation | C/Z ROP |

700, 701, 702, 703

GRAPHICS PROCESSING APPARATUS AND METHOD OF PROCESSING GRAPHICS PIPELINE THEREOF

CROSS-REFERENCE TO RELATED APPLICATION

This application claims the benefit of priority from Korean Patent Application No. 10-2016-0172880, filed on Dec. 16, 2016, in the Korean Intellectual Property Office, the disclosure of which is incorporated by reference herein.

1. TECHNICAL FIELD

The present disclosure relates to a graphics processing apparatus and a method of processing a graphics pipeline thereof.

2. DISCUSSION OF THE RELATED ART

Three-dimensional (3D) graphics application program interface (API) standards include OpenGL, OpenGL ES, and Direct 3. API standards provide ways of performing a graphics pipeline to render frames that provide a certain degree of uniformity in accordance with the standard. While a graphics pipeline is performed to render frames, a graphics processing apparatus such as a graphics processing unit (GPU) performs multiple operations and consumes a relatively large amount of power. Thus, performance of the graphics processing apparatus is considerably influenced by a quantity of operations and memory accesses performed by the graphics processing apparatus while rendering frames.

SUMMARY

The inventive concept is directed to a graphics processing apparatus and a method of processing a graphics pipeline in the graphics processing apparatus.

Additional teachings of the inventive concept will be set forth in part in the description which follows and, in part, will be apparent from the description, and/or may be learned by practice of the presented embodiments.

According to an embodiment of the inventive concept, a graphics processing apparatus for processing a graphics pipeline includes a shading processor configured to perform pixel shading to process pixels corresponding to a three-dimensional (3D) object of a 3D image; a texturing processor configured to texture the object, determine a post-processing operation mode from among a plurality of post-processing operation modes to adjust visual effects of the textured object, and transmits data of the textured object to a processing path of a plurality of processing paths for the post-processing operation in accordance with the determined post-processing mode; and a reorder buffer configured to buffer data of the object in accordance with a processing order when the processing path for a post-processing operation bypasses the shading processor.

A graphic driver may be connected to the graphics pipeline via a bus, and the texturing processor determines the post-processing operation mode according to graphic state information provided from the graphic driver that indicates the post-processing operation mode from among the plurality of post-processing operation modes.

According to an embodiment of the inventive concept, a frame buffer the texturing processor transmits the data of the textured object to the shading processor when based on the graphic state information the determined post-processing operation mode is a first mode in which the shading processor performs the post-processing operation.

A color/depth blending processor is connected to the shading processor and the reorder buffer; and the texturing processor transmits result data of the post-processing operation to the reorder buffer to buffer data for input to the color/depth blending processor via one of the plurality of processing paths that bypasses the shading processor upon determination that the post-processing operation mode is a second mode in which the texturing processor performs the post-processing operation based on the graphic state information and transmits result data of the post-processing operation to the color/depth blending processor is configured to receive the post-processed textured object as finally rendered display data.

According to an embodiment of the inventive concept, a method of processing a graphics pipeline by a graphics processing apparatus includes performing pixel shading to process pixels corresponding to a three-dimensional (3D) object of a 3D image, the pixel shading being performed by a shading processor; texturing the object, the texturing being performed by a texturing processor; determining a post-processing operation mode from among a plurality of post-processing operation modes to adjust visual effects of the textured object, the determining being performed by the texturing processor; and transmitting data of the textured object to a processing path of a plurality of processing paths for the post-processing operation in accordance with the determined post-processing mode, the transmitting data being performed by the texturing processor, wherein data of the object is buffered by a reorder buffer in accordance with a processing order when the processing path for the post-processing operation bypasses the shading processor, and wherein the plurality of processing paths partially overlap each other.

The performing of the post-processing operation by the texturing processor occurs in response to determining from the graphic state information that the post-processing operation mode is a second mode, and transmitting a result data of the post-processing operation to a color/depth blending processor.

The result data is transmitted to the color/depth blending processor via the reorder buffer to buffer input data of the color/depth blending processor and via a pall bypassing the shading processor.

The graphics pipeline may include a shading processor configured to perform pixel shading, and a texturing processor to performing texturing of the 3D object to provide a textured object; and in a first mode the shading processor performs a post-processing operation on the textured object and outputs the post-processed textured object to a buffer; wherein in a second mode the texturing processor is configured to perform texturing of the 3D object and bypasses the shading processor to output the post-processed textured object to the buffer; and wherein a processing path of the first mode and the second mode partially overlap each other.

According to an embodiment of the inventive concept, there is provided a computer-readable recording medium on which a program configured to implement the method in a computer is recorded.

BRIEF DESCRIPTION OF THE DRAWINGS

The teachings of the inventive concept will become more readily appreciated by a person of ordinary skill in the art from the following description of the embodiments, taken in conjunction with the accompanying drawings in which:

FIG. 7 is a diagram that illustrates mode information for a post-processing operation according to an embodiment of the inventive concept;

DETAILED DESCRIPTION

Figure 1:
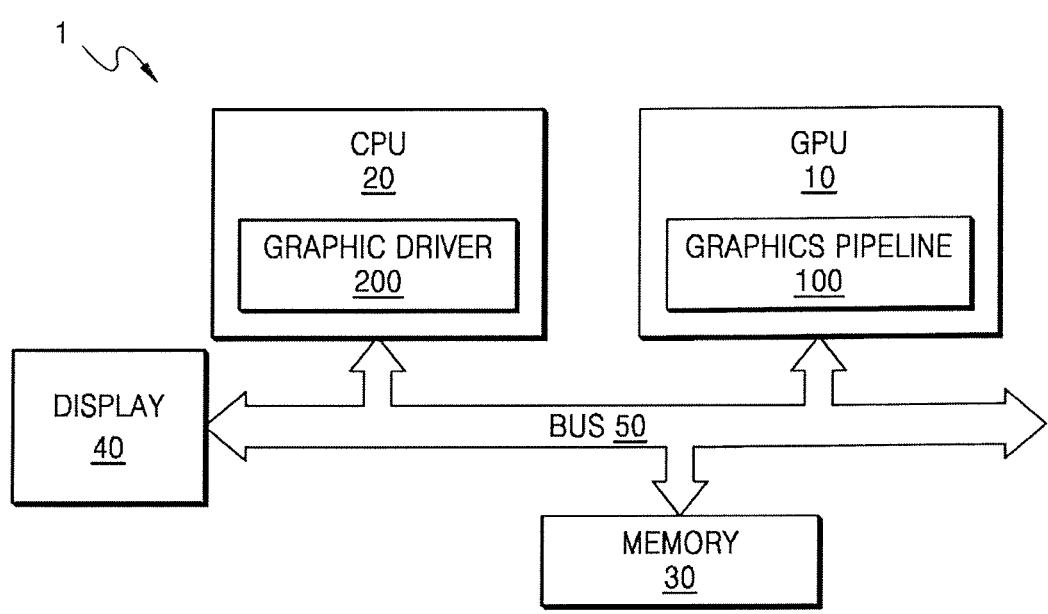
FIG. 1 is a diagram illustrating a computing system according to an embodiment of the inventive concept.

Reference will now be made in detail to embodiments of the inventive concept, examples of which are illustrated in the accompanying drawings, wherein like reference numerals refer to like elements throughout. In this regard, the present embodiments of the inventive concept may have different forms than disclosed herein. Accordingly, the inventive concept should not be construed as being limited to the descriptions set forth herein. Accordingly, the embodiments are disclosed below, by referring to the figures, to explain teachings of the inventive concept. As used herein, the term "and/or" includes any and all combinations of one or more of the associated listed items. Expressions such as "at least one of," when preceding a list of elements, modify the entire list of elements and do not modify the individual elements of the list.

The terms used in this specification are terms known in the art in consideration of operations with regard to the present disclosure. However, the terms used in the specification may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple terms but as being based on the meaning of the terms and the overall description of the disclosure.

Throughout the specification, a person of ordinary skill in the art should understand that when a portion is connected to another portion, it can be directly connected to the other portion or electrically connected to the other portion with intervening portions present therebetween. It will also be understood that when a component "includes" an element, it should be understood that the component does not exclude another element but may further include another element unless there is another opposite description thereto. In addition, the term "unit" refers to a unit that performs at least one function or operation, and the unit may be implemented as hardware or a combination of hardware and software.

Throughout the specification, the term "including" or "having" should not be understood as necessarily including or having all of the components or operations described in the specification, but should be understood as not including or having some operations or further including or having an additional component or operation.

Hereinafter, embodiments of the present inventive concept will be described in detail with reference to the accompanying drawings.

FIG. 1 is a diagram illustrating a computing system according to an embodiment of the inventive concept.

Referring to FIG. 1, a computing system 1 includes a graphics processing unit (GPU) 10, a central processing unit (CPU) 20, a memory 30, a display 40, and a bus 50 that provides a communicative path between the aforementioned components. FIG. 1 only illustrates components related to embodiments of the computing system 1. Thus, a person of ordinary skill in the art should appreciate that the computing system 1 may further include other components in addition to those illustrated in FIG. 1.

Some non-limiting examples of devices including the computing system 1 may include desktop computers, notebook computers, smartphones, personal digital assistants (PDAs), portable media players, video game consoles, TV set-top boxes, tablet devices, E-book readers, wearable devices, and head mounted display (HMD) devices, without being limited thereto. For example, the computing system 1 is a system included in a device having graphics processing functions to display contents and may be applied to various types of devices.

The CPU 20 includes hardware to control overall operations and functions of the computing system 1. For example, the CPU 20 may drive an operating system (OS), call a graphics application programming interface (API) for the GPU 10, and execute a graphic driver 200 to drive the GPU 10. In addition, the CPU 20 may execute various applications stored in the memory 30, such as web-browsing applications, game applications, and video applications.

The GPU 10, as a graphics processing apparatus that processes the graphics pipeline 100, may perform on graphic-related functions. For example, the GPU 10 may be hardware configured to perform a 3D graphics pipeline 100 to render a 3D object of a 3D image into a two-dimensional (2D) image to be displayed. For example, the GPU 10 may perform various functions such as shading, blending, and illuminating and various functions to generate pixel values of pixels to be displayed.

The graphics pipeline 100 performed by the GPU 10 may be a graphics pipeline for tile-based rendering (TBR) or a graphics pipeline immediate rendering (IMR) that does not use a form of tile-based rendering.

Referring to FIG. 1, the graphics pipeline 100 processed by the GPU 10 may be a graphics pipeline defined by various versions of graphics APIs such as DirectX and OpenGL APIs. For example, the graphics pipeline 100 according to the present embodiment may be applied to various APIs without being limited to any particular version or any type of the APIs. The graphic driver 200 executed by the CPU 20 may be software to provide various instructions and data to perform the graphics pipeline 100 in the GPU 10. For example, the graphic driver 200 provides draw calls to render various objects and graphic state information such as Gstate to the graphics pipeline 100.

The memory 30 comprises hardware to store various data processed by the computing system 1. For example, the memory 30 may store data that is processed or to be processed by the GPU 10 and CPU 20. Also, the memory 30 may store applications, drivers, and the like that are driven by the GPU 10 and CPU 20. The memory 30 may include a random access memory (RAM) such as dynamic random access memory (DRAM) and a static random access memory (SRAM), a read-only memory (ROM), an electrically erasable programmable read-only memory (EEPROM), CD-ROM, Blu-ray, or other types of optical disc storage, a hard disk drive (HDD), a solid state drive (SSD), or a flash memory. Furthermore, the memory 30 may include an external storage device for accessing the computing system 1.

The display 40 includes hardware to display an image processed by the GPU 10. For example, the display 40 may display an image rendered by the GPU 10. The display 40 includes screen pixels having a predetermined resolution, and the GPU 10 renders an image in accordance with the resolution. The display 40 may be implemented using, for example, thin film technology or other technologies, and examples of various display panels include liquid crystal display (LCD) and organic light-emitting display (OLED).

The bus 50 comprises hardware that provides paths to connect hardware components to permit data transfer therebetween in the computing system 1. Examples of the bus 50 may include PCI bus and PCI Express bus.

Figure 2:
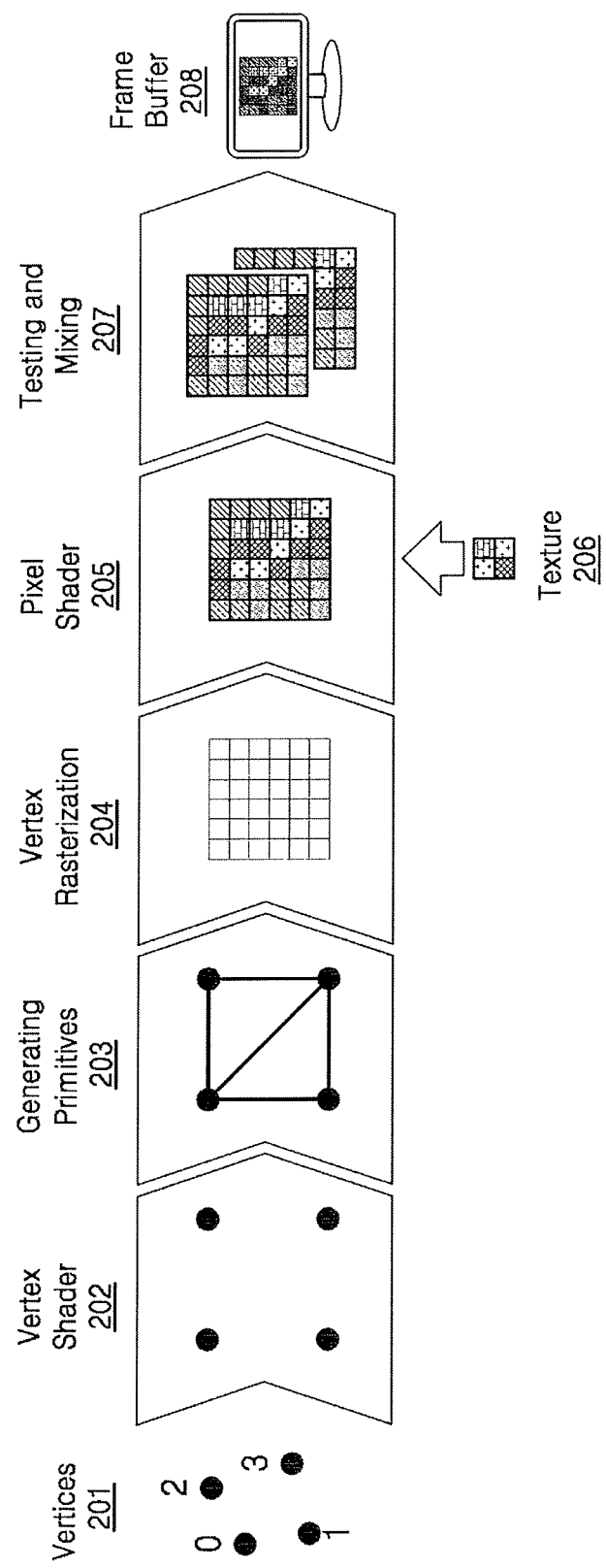
FIG. 2 is a diagram illustrating stages of a graphics pipeline processed by a graphics processing unit (GPU) according to an embodiment of the inventive concept.

FIG. 2 is a diagram for describing a graphics pipeline processed by a GPU according to an embodiment of the inventive concept.

Referring to FIG. 2, in operation 201, vertices are created. The vertices are created to represent objects to be included in 3D graphics.

In operation 202, the created vertices are shaded. A vertex shader may perform vertex shading by defining positions of the vertices created in operation 201.

In operation 203, primitives are generated. A primitive refers to a point, line, polygon, or the like formed by using one or more vertices such as created in operation 201. For example, a primitive may be a triangle formed by connecting three vertices.

In operation 204, the generated primitives are rasterized. Rasterization of a primitive refers to dividing the primitive into fragments. A fragment may be a basic unit to process graphics for the primitive. Since the primitive includes information only about vertices, 3D graphics may be processed by generating fragments between vertices via rasterization.

In operation 205, pixels are shaded. More particularly, the fragments constituting the primitive that were generated by rasterization may correspond to pixels of a screen space. The terms "fragment" and "pixel" may be used interchangeably. For example, a pixel shader may also be referred to as a fragment shader. In general, a basic unit for graphics processing constituting the primitive may be referred to as a fragment, and a basic unit for graphics processing performed after pixel shading may be referred to as pixel. Pixel values, properties such as colors of pixels, and the like may be determined by pixel shading.

In operation 206, texturing is performed to determine colors of pixels. Texturing may refer to a process of determining colors of pixels by using predetermined textures. To realize various colors and patterns via pixels, respective colors of all pixels may be calculated and determined. The GPU 10 may determine the colors of the pixels by using predetermined textures. In this regard, textures having different resolutions may be predefined to adaptively correspond to a size of an object drawn in pixels. A collection of predefined textures having different resolutions is referred to as a mipmap.

In operation 207, testing and mixing may be performed. Pixel values that are to be finally displayed are determined by a depth test, curling, and clipping. The testing and mixing operation 207 may also be referred to as any other terms such as color/depth blending operation and color/depth raster operation (C/Z ROP).

In operation 208, frames generated through operations 201 to 207 are stored in a frame buffer. The frames stored in the frame buffer may be displayed via a display 40 (such as shown in FIG. 1).

Moreover, the graphics pipeline 100 may be a tile-based graphics pipeline or a tile-based rendering (TBR) pipeline. The term "tile-based" refers to a process of dividing or partitioning each frame of a moving image into a plurality of tiles and performing rendering of each tile. Particularly, if the graphics pipeline 100 is a tile-based graphics pipeline, the graphics pipeline 100 may include a binning pipeline and a rendering pipeline. The binning pipeline refers to a process of generating a list of tiles indicating vertices, primitives, or patches making up a 2D or 3D object. Thus, the term binning pipeline may be replaced with other terms such as tiling pipeline and binning phase. The rendering pipeline refers to a process of rendering an object per tile based on the list of tiles generated by the binning pipeline. Upon completion of the rendering pipeline, expressions of the 2D or 3D object to be displayed on a 2D display via pixels may be determined. The term rendering pipeline may also be replaced with other terms such as rendering phase.

In other words, the types of the graphics pipeline 100 are not limited to the above-discussion.

Figure 3:
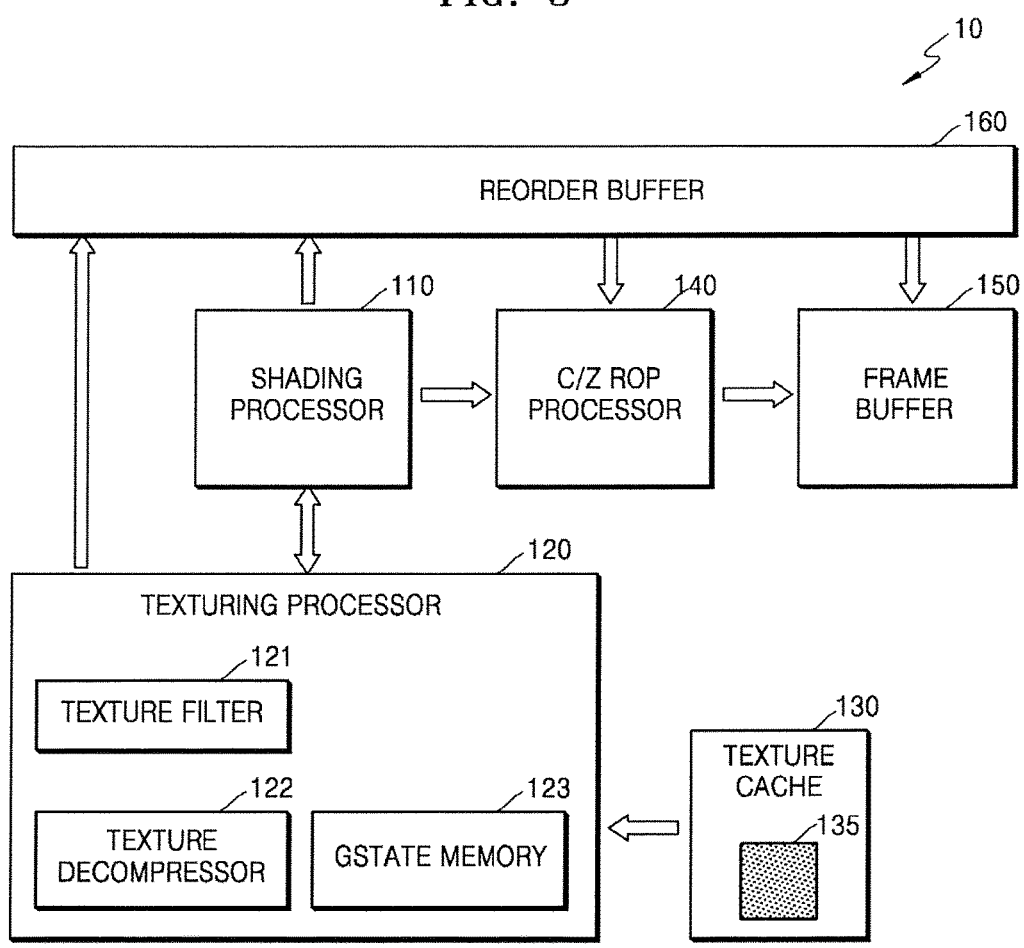
FIG. 3 is a block diagram of a hardware structure of a GPU according to an embodiment of the inventive concept.

FIG. 3 is a block diagram of a hardware structure of a GPU according to an embodiment of the inventive concept.

FIG. 3 primarily illustrates hardware components related to pixel shading, texturing, C/Z ROP processes among rendering processes of the graphics pipeline 100. Although not shown in FIG. 3, a person of ordinary skill in the art should appreciate that the GPU 10 may further include any other hardware components in addition to those illustrated in FIG. 3.

The GPU 10 may include a shading processor 110, a texturing processor 120, a texture cache 130, a C/Z ROP processor 140, a frame buffer 150, and a reorder buffer 160. The texturing processor 120 may include a texture filter 121, a texture decompressor 122, and a Gstate memory 123.

Meanwhile, each of the components to perform the graphics pipeline 100 may be implemented using program logics or software modules to execute functions which will be described later. Alternatively, the aforementioned components to perform the graphics pipeline 100 may be integrated into a single process of the GPU 10 or may be implemented as respective sub-processing units or processor cores of the GPU 10. For example, implementation of the components to perform the graphics pipeline 100 is not limited to those described above. Furthermore, although the components performing the graphics pipeline 100 may be named based on functions thereof which will be described later, a person of ordinary skill in the art should appreciate that the names of the components may be modified in various manners.

The names of the components of the GPU 10 performing the graphics pipeline 100 disclosed herein are provided for ease of description, and such names may be modified in accordance with the types and versions of a graphic API. For example, the components of the GPU 10 used to perform the graphics pipeline 100 may correspond to various other names as defined by APIs such as DirectX, CUDA, and OpenGL.

The shading processor 110 performs pixel shading to process pixels corresponding to the object. For example, the shading processor 110 may be a processor that operates as a pixel shader in the graphics pipeline 100. Thus, as described above, the shading processor 110 may create pixels corresponding to primitives of the object generated by rasterization and determine values and properties of the pixels.

The texturing processor 120 textures the object by using textures, to provide surface detail such as color. The texturing processor 120 may be a processor serving as a texture unit in the graphics pipeline 100. Texturing is a process of determining colors of pixels by using textures that are predetermined images. The texturing processor 120 may determine colors of pixels by enlarging or reducing textures of a separate 2D image to map colors to pixels of the surface of the object in accordance with a position and size of the object on a screen or by interpolating texel values of textures having various resolutions. For example, a two-dimensional surface may be wrapped around a three-dimensional object.

The texture cache 130 (shown in FIG. 3) may store a compressed texture 135. When the texturing processor 120 requests the compressed texture 135 from the texture cache 130, the texture cache 130 transfers the compressed texture 135 to the texturing processor 120. The texture decompressor 122 decompresses the compressed texture 135.

The texture filter 121 performs texture filtering by using texel values included in the textures. The filtering of the texel values may refer to calculating color values corresponding to the pixels of the object generated by the shading processor 110 by blending texel values. The texture filter 121 may perform texture filtering in various modes such as point filtering, bilinear filtering, and tri-linear filtering. Upon completion of the texture filtering, the texturing processor 120 textures the object by mapping the textures to the pixels of the object. In addition, the texture filter 121 may determine whether to perform a post-processing operation via operation of the filter, or transmit data to the pixel shader to perform post-processing.

The Gstate memory 123 stores graphic state information (Gstate) provided (or received) from the graphic driver 200 (shown in FIG. 1).

The reorder buffer 160 (FIG. 3) buffers data of the object such that data of the object is sequentially processes in accordance with a processing order of the graphics pipeline 100.

Moreover, according to the present embodiment of the inventive concept, rather than have the shading processor 110 perform a post-processing operation, the texturing processor 120 may directly perform post-processing operation to adjust visual effects of the textured object or transmit result data of the post-processing operation via a bypass that is a more efficient processing path. Accordingly, an inefficient data transfer, and/or a transfer of data that may not be used by the shading processor 110 for post-processing is prevented. Therefore, the data transfer between the hardware components may be reduced in the GPU 10, the number of memory read/write operations of the GPU 10 may be reduced, and the overall number of operations of the hardware components of the GPU 10 may be reduced. In this regard, the post-processing operation may refer to anti-aliasing operation for the textured object, and/or an operation to give various filtering effects such as black-and-white color effect and blur effect on the textured object, and the like after texturing of the object is completed.

More particularly, upon completion of texturing of the object, the texturing processor 120 determines a post-processing operation mode to adjust visual effects of the textured object and transmits the data of the textured object to a processing path to perform post-processing operation in accordance with the determined mode. In this regard, if the processing path bypasses the shading processor 110, the reorder buffer 160 may buffer data of the object such that the data of the object is sequentially processed in accordance with a processing order of the graphics pipeline 100.

The texturing processor 120 may determine a post-processing operation mode by using graphic state information including information indicating the post-processing operation mode provided from the graphic driver 200. The graphic state information provided from the graphic driver 200 may be stored in the Gstate memory 123. The graphic state information may include mode information of a table 700 shown in FIG. 7.

More particularly, the graphic state information may include information indicating whether the post-processing operation is performed by the shading processor 110 or the texturing processor 120, information indicating the type of the post-processing operation, and information indicating a path to transmit result data of the post-processing operation when the post-processing operation is performed by the texturing processor 120. The texturing processor 120 may determine the post-processing operation mode based on the information included in the graphic state information as described above.

If the texturing processor 120 determines that the textured object should be post-processed, the texturing processor 120 may determine the post-processing operation mode to be used. For example, the texturing processor 120 may determine that a first mode, a second mode, or a third mode should be used.

Upon determination that the post-processing operation mode to be applied to the textured object is the first mode, in which the post-processing operation is performed by the shading processor 110, based on graphic state information, the texturing processor 120 transmits data of the textured object to the shading processor 110.

Upon determination that the post-processing operation mode to be applied to the textured object is the second mode, in which the post-processing operation is performed by the texturing processor 120 and result data of the post-processing operation is transmitted to the C/Z ROP processor 140 (color/depth blending processor), based on graphic state information, the texturing processor 120 transmits the resultant data of the post-processing operation to the reorder buffer 160 that buffers data to be input to the C/Z ROP processor 140 via a path bypassing the shading processor 110.

Upon determination that the post-processing operation mode to be applied to the textured object is the third mode, in which the post-processing operation mode is performed by the texturing processor 120 and result data of the post-processing operation is transmitted to the frame buffer 150, based on graphic state information, the texturing processor 120 transmits result data of the post-processing operation to the reorder buffer 160 (see FIG. 3) that buffers data to be input to the frame buffer 150 via a path bypassing the shading processor 110 and the C/Z ROP processor 140.

For example, the reorder buffer 160 may buffer the result data of the post-processing operation received via a bypass until data to be input to the C/Z ROP processor 140 and the frame buffer 150 are prepared. FIG. 3 shows a path from the shading processor 110 to the C/Z ROP processor 140 to the frame buffer 150.

In the second mode or third mode, in which the processing path bypasses the shading processor 110, the texturing processor 120 may perform the post-processing operation using a texture filter operator implemented by the texturing processor 120.

In general, the shading processor 110 (e.g., pixel shader) is known as a processor that performs the post-processing operation. Thus, the texturing processor 120 in general transmits data of the textured object to the shading processor 110 after texturing of the object is completed even in the case where the post-processing operation of the object is a relatively simple operation. Thus, in the case where a simple post-processing operation is performed by the shading processor, such a process is inefficient. For example, power consumption increases due to data transmission to the shading processor 110, the number of memory accesses (read/write) to the shading processor 110 increases, and the number of operations of the shading processor 110 increases.

Moreover, although in a case where the post-processing operation is a simple linear operation such as "(a+b)/2", the shading processor 110 may perform various instructions such as fetch, ADD, and DIV to process the post-processing operation. According to the inventive concept, in a case where a simple linear operation may be recommended for post-processing, the texturing processor 120 may perform the post-processing. For example, if a linear interpolation operator is implemented, the operation "(a+b)/2" may be simply processed by the texturing processor 120 without performing the instructions of fetch, ADD, and DIV that would be performed by the shading processor.

For example, according to the inventive concept, the texturing processor 120 may execute a filter operator such as a bi-linear interpolation operator and a tri-linear interpolation operator to perform operation to filter and generate textures.

If the post-processing operation is the simple linear interpolation operation "(a+b)/2" as described above, a filter operator supported by the texturing processor 120 may be executed such that the texturing processor 120, (rather than the shading processor 110), performs the post-processing operation. If the texturing processor 120 has the ability to perform a simple post-processing operation, the GPU 10 may have an enhanced processing performance by reducing data transmission to the shading processor 110, the memory access (read/write) to the shading processor 110, and the number of operations of the shading processor 110.

A compiler may analyze the type of the post-processing operation for the object and perform compiling such that the texturing processor 120, instead of the shading processor 110, performs the post-processing operation if the post-processing operation is a simple operation. For example, the compiler may generate graphic state information Gstate including mode information of the post-processing operation indicating that the texturing processor 120 operates in accordance with the second or third mode described above for a simple post-processing operation. The graphic driver 200 may provide graphic state information including mode information of the post-processing operation to the texturing processor 120.

Figure 4:
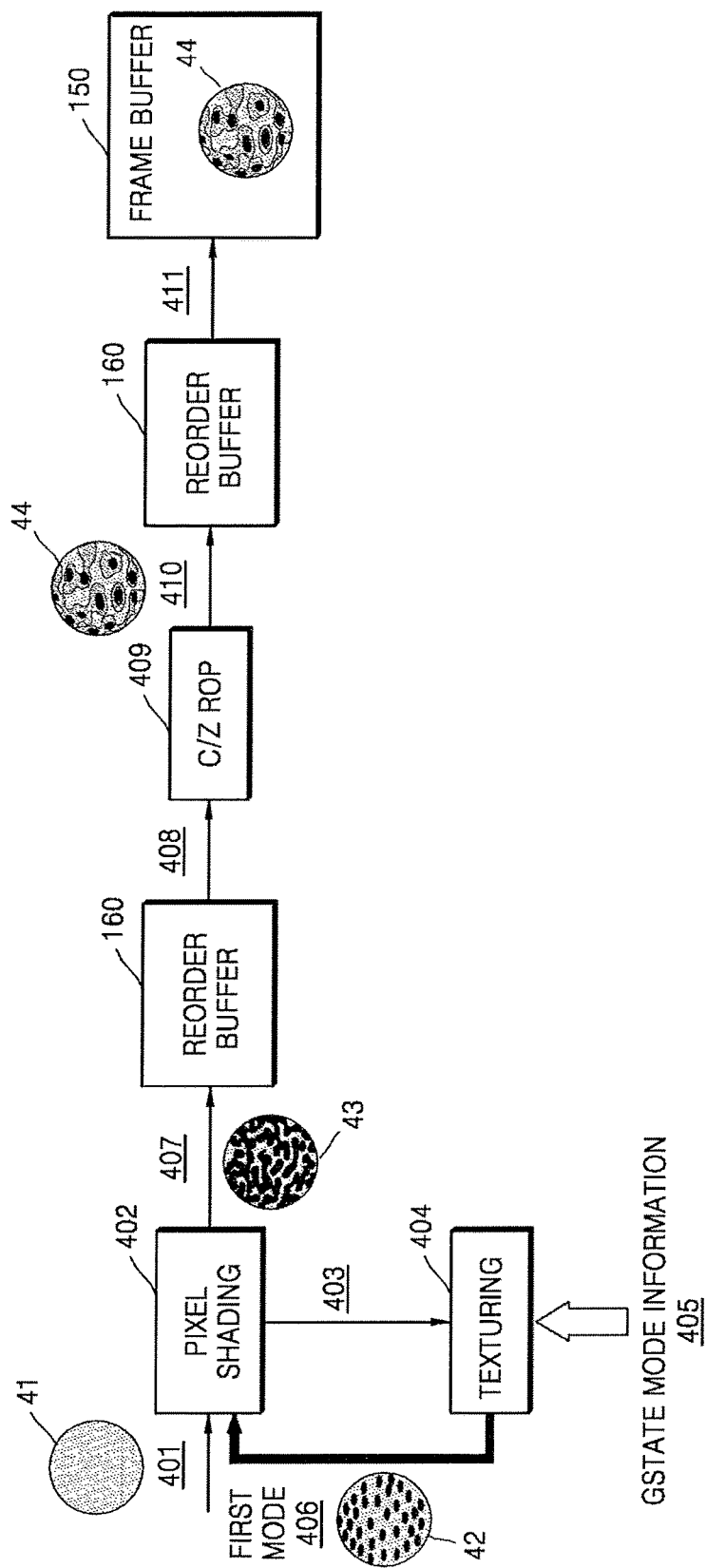
FIG. 4 is a diagram illustrating a processing path of data of an object when a post-processing operation mode is a first mode according to an embodiment of the inventive concept.

FIG. 4 is a diagram for describing a processing path of data of the object when the post-processing operation mode is the first mode according to an embodiment of the inventive concept.

In operation 401, the shading processor 110 receives data of an object 41 after rasterization thereof is completed.

In operation 402, the shading processor 110 performs pixel shading to process pixels corresponding to the object 41.

In operation 403, the shading processor 110 transmits results of the pixel shading to the texturing processor 120.

In operation 404, the texturing processor 120 textures the object by using textures.

In operation 405, the texturing processor 120 determines the post-processing operation mode as the first mode based on graphic state information (Gstate mode information).

In operation 406, the texturing processor 120 transmits data of a textured object 42 to the shading processor 110 for a post-processing operation of the textured object 42 in accordance with the first mode.

In operation 407, upon completion of the post-processing operation of the textured object 42, the shading processor 110 transmits data of a post-processed object 43 to the reorder buffer 160.

In operation 408, the reorder buffer 160 buffers the data of the post-processed object 43 and transmits the data of the post-processed object 43 to the C/Z ROP processor 140. In addition, although in FIG. 4 the data of the post-processed object 43 is buffered by the reorder buffer 160, the present embodiment is not limited thereto. For example, the shading processor 110 may directly transmit the data of the post-processed object 43 to the C/Z ROP processor 140 with no buffering by the reorder buffer 160. Furthermore, if C/Z ROP of the post-processed object 43 performed by the C/Z ROP processor 140 is not required, the shading processor 110 may store the data of the post-processed object 43 in the frame buffer 150 as finally rendered data.

In operation 409, the C/Z ROP processor 140 performs C/Z ROP of the post-processed object 43.

In operation 410, upon completion of C/Z ROP of the post-processed object 43, the C/Z ROP processor 140 transmits data of a finally rendered object 44 to the reorder buffer 160.

In operation 411, the reorder buffer 160 buffers the data of the rendered object 44 and transmits the data of the rendered object 44 to the frame buffer 150. Meanwhile, although FIG. 4 illustrates that the data of the rendered object 44 is buffered by the reorder buffer 160, the present embodiment is not limited thereto. The C/Z ROP processor 140 may transmit the data of the rendered object 44 to be stored in the frame buffer 150 without any buffering by the reorder buffer 160.

Figure 5:
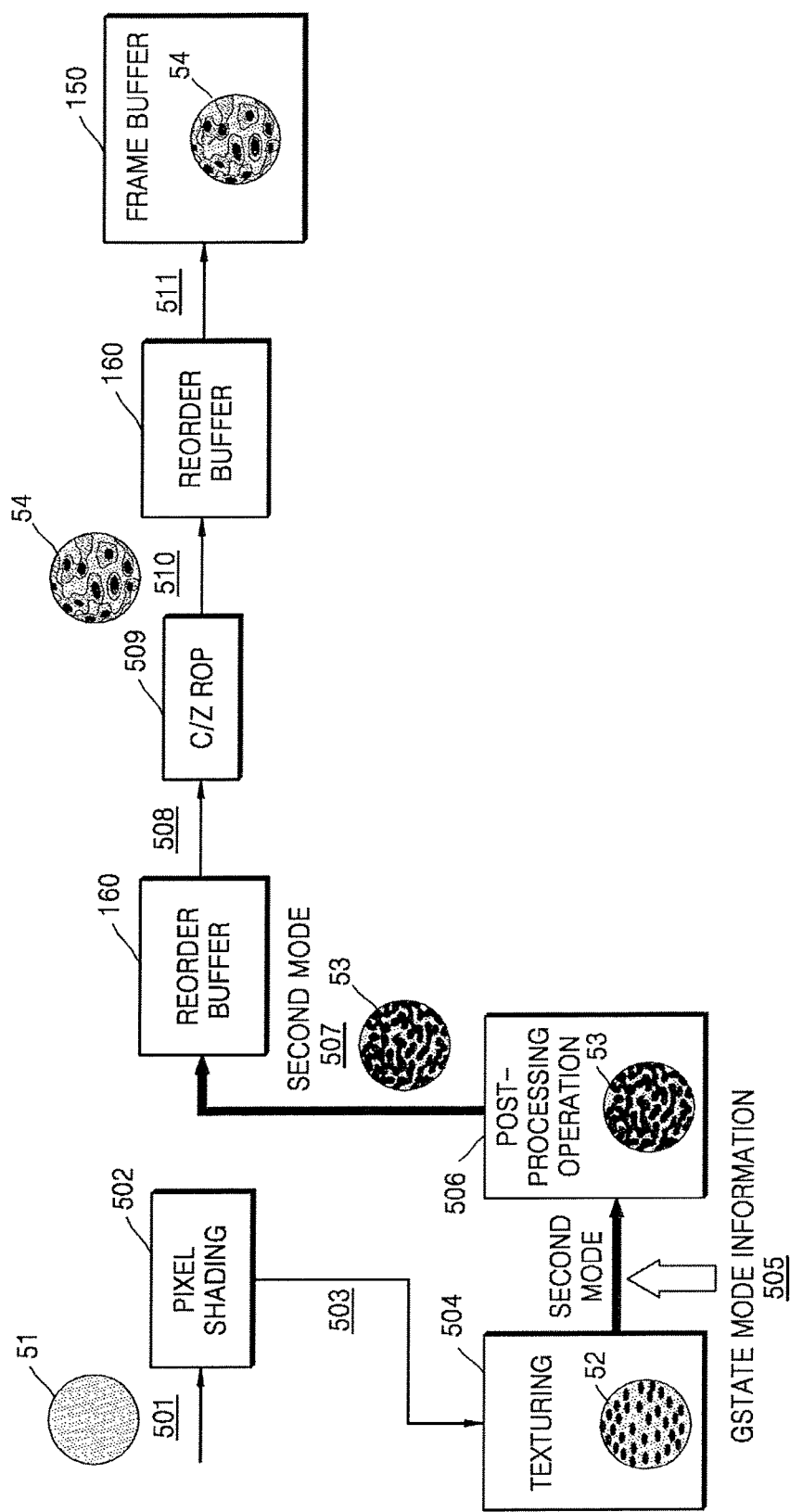
FIG. 5 is a diagram illustrating a processing path of data of an object when a post-processing operation mode is a second mode according to an embodiment of the inventive concept.

FIG. 5 is a diagram for describing a processing path of data of the object when the post-processing operation mode is the second mode according to an embodiment of the inventive concept.

In operation 501, the shading processor 110 receives data of an object 51 after rasterization thereof is completed.

In operation 502, the shading processor 110 performs pixel shading to process pixels corresponding to the object 51.

In operation 503, the shading processor 110 transmits results of the pixel shading to the texturing processor 120.

In operation 504, the texturing processor 120 textures the object by using textures to create a textured object 52.

In operation 505, the texturing processor 120 determines the post-processing operation mode as the second mode based on graphic state information (Gstate mode information).

In operation 506, the texturing processor 120 performs the post-processing operation of data of the textured object 52 in accordance with the second mode to create a post-processed object 53. Thus, unlike the first mode, where the textured object data is transmitted to shading processor, in the second mode, the texturing processor 120 performs the post-processing operation.

In operation 507, the texturing processor 120 transmits data of the post-processed object 53 to the reorder buffer 160. The reorder buffer 160 buffers the data of the post-processed object 53 until the data of the post-processed object 53 is used as input data of the C/Z ROP processor 140. In other words, the reorder buffer 160 buffers the data of the post-processed object 53 until data, which may be input to the C/Z ROP processor 140 before the data of the post-processed object 53 is input thereto, is stored in the reorder buffer 160. Thus, the processing order is maintained.

In operation 508, the reorder buffer 160 transmits the data of the post-processed object 53 to the C/Z ROP processor 140.

In operation 509, the C/Z ROP processor 140 performs C/Z ROP of the post-processed object 53.

In operation 510, upon completion of C/Z ROP of the post-processed object 53, the C/Z ROP processor 140 transmits data of a finally rendered object 44 to the reorder buffer 160.

In operation 511, the reorder buffer 160 buffers the data of the rendered object 54 and transmits the data of the rendered object 54 to the frame buffer 150. Although FIG. 5 illustrates that the data of the rendered object 54 is buffered by the reorder buffer 160, the present embodiment is not limited thereto. The C/Z ROP processor 140 may store the data of the rendered object 54 in the frame buffer 150 without a buffering by the reorder buffer 160.

Figure 6:
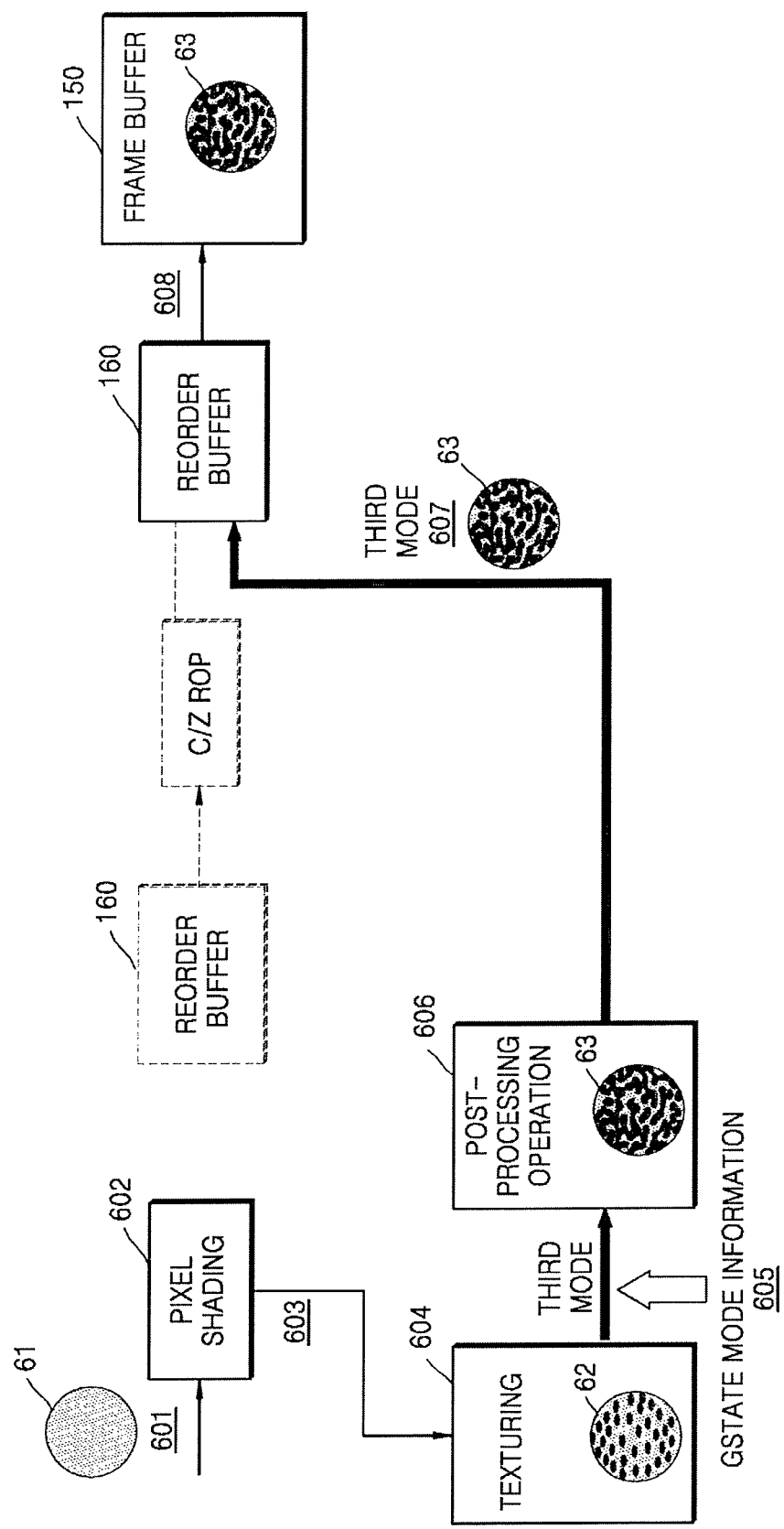
FIG. 6 is a diagram illustrating a processing path of data of an object when a post-processing operation mode is a third mode according to an embodiment.

FIG. 6 is a diagram illustrating a processing path of data of the object when the post-processing operation mode is the third mode according to an embodiment of the inventive concept.

In operation 601, the shading processor 110 receives data regarding an object 61 after rasterization of the object is completed.

In operation 602, the shading processor 110 performs pixel shading to process pixels corresponding to the object 61.

In operation 603, the shading processor 110 transmits the results of the pixel shading to the texturing processor 120 so that texturing of the object may be performed.

In operation 604, the texturing processor 120 textures the object by using textures to create a textured object 62. The texturing processor 120 may determine colors of the pixels as discussed herein above.

In operation 605, the texturing processor 120 determines the post-processing operation mode as the third mode based on graphic state information (Gstate mode information).

In operation 606, the texturing processor 120 performs the post-processing operation of data of the textured object 62 in accordance with the third mode to create a post-processed object 63.

In operation 607, the texturing processor 120 transmits data of the post-processed object 63 to the reorder buffer 160.

In operation 608, the reorder buffer 160 stores the data of the post-processed object 63 in the frame buffer 150 as data of a finally rendered object. The reorder buffer 160 may buffer the data of the post-processed object 63 until data, which may be input to the C/Z ROP processor 140 before the data of the post-processed object 63 is input thereto, is stored in the reorder buffer 160. Meanwhile, although FIG. 6 illustrates that the data of the post-processed object 63 is buffered by the reorder buffer 160, the present embodiment is not limited thereto. The texturing processor 120 may store the data of the post-processed object 63 in the frame buffer 150 as data of the finally rendered object with no buffering by the reorder buffer 160.

Referring to FIG. 6, since the processing path of the third mode bypasses the C/Z ROP processor 140, C/Z ROP of the C/Z ROP processor 140 may be skipped, which is different from the second mode. The processing path of the third mode may be selected when C/Z ROP of the post-processed object 63 is not required.

FIG. 7 is a diagram illustrating the determining of mode information for post-processing operation according to an embodiment of the inventive concept.

Referring to FIG. 7, the graphic driver 200 (shown in FIG. 2) may provide graphic state information including mode information of the post-processing operation. The graphic driver 200 provides the GPU 10 with draw calls to draw the object belonging to each frame and graphic state information (Gstate) corresponding to the respective draw calls. The Gstate information may include information about a mode type 701, information about a type of the post-processing operation 702 to be performed on the textured object, and information about a path 703 to transmit data of the post-processed object in case of the second mode or third mode bypassing the shading processor 110.

In addition, the table 700 of FIG. 7 shows information related to the present embodiments, and a person of ordinary skill in the art should appreciate that the draw calls and graphic state information may further include various other information. Furthermore, the graphic driver 200 may provide the GPU 10 with information about the mode type 701, the type of the post-processing operation 702, and the path 703 as bitstreams.

Figure 8:
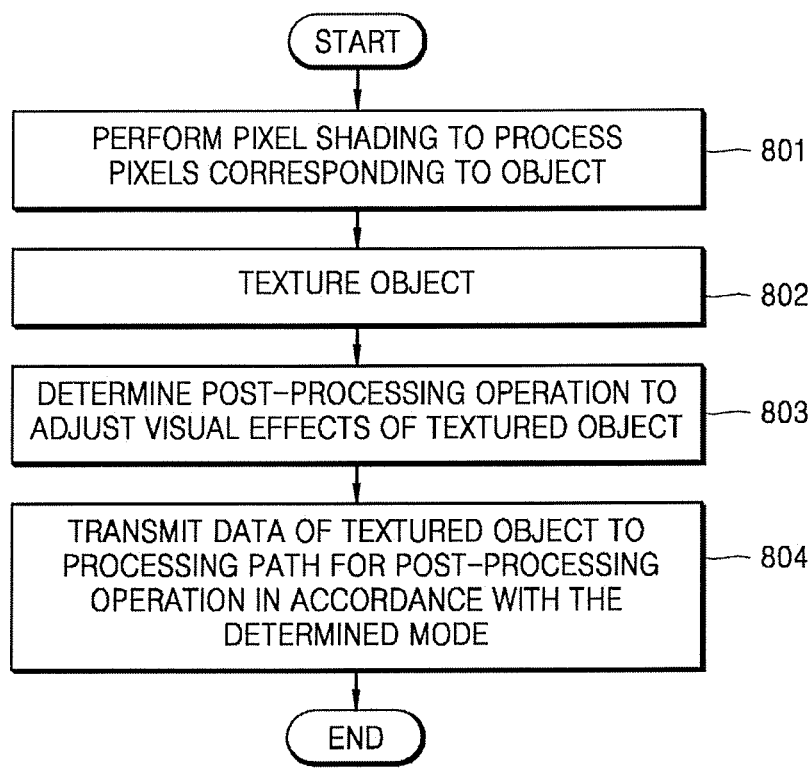
FIG. 8 is a flowchart illustrating a method of processing a graphics pipeline by a graphics processing apparatus according to an embodiment of the inventive concept.

FIG. 8 is a flowchart illustrating a method of processing a graphics pipeline by a graphics processing apparatus according to an embodiment of the inventive concept.

Referring to FIG. 8, since the method of processing the graphics pipeline is a time-series method performed in the computing system 1 (GPU 10) described above, the descriptions presented above but omitted herein below may also be applied to the method of processing the graphics pipeline of FIG. 8.

In operation 801, the shading processor 110 performs pixel shading to process pixels corresponding to an object.

In operation 802, the texturing processor 120 textures the object. Texturing is performed to determine colors of pixels, which may include the use of predetermined textures.

In operation 803, the texturing processor 120 determines a post-processing operation mode to adjust visual effects of the textured object.

In operation 804, the texturing processor 120 transmits data of the textured object to a processing path for the post-processing operation in accordance with the determined mode. In this case, if the processing path bypasses the shading processor 110 to reduce an amount of data transfer, the reorder buffer 160 may buffer data of the object in accordance with a processing order of the data.

Figure 9:
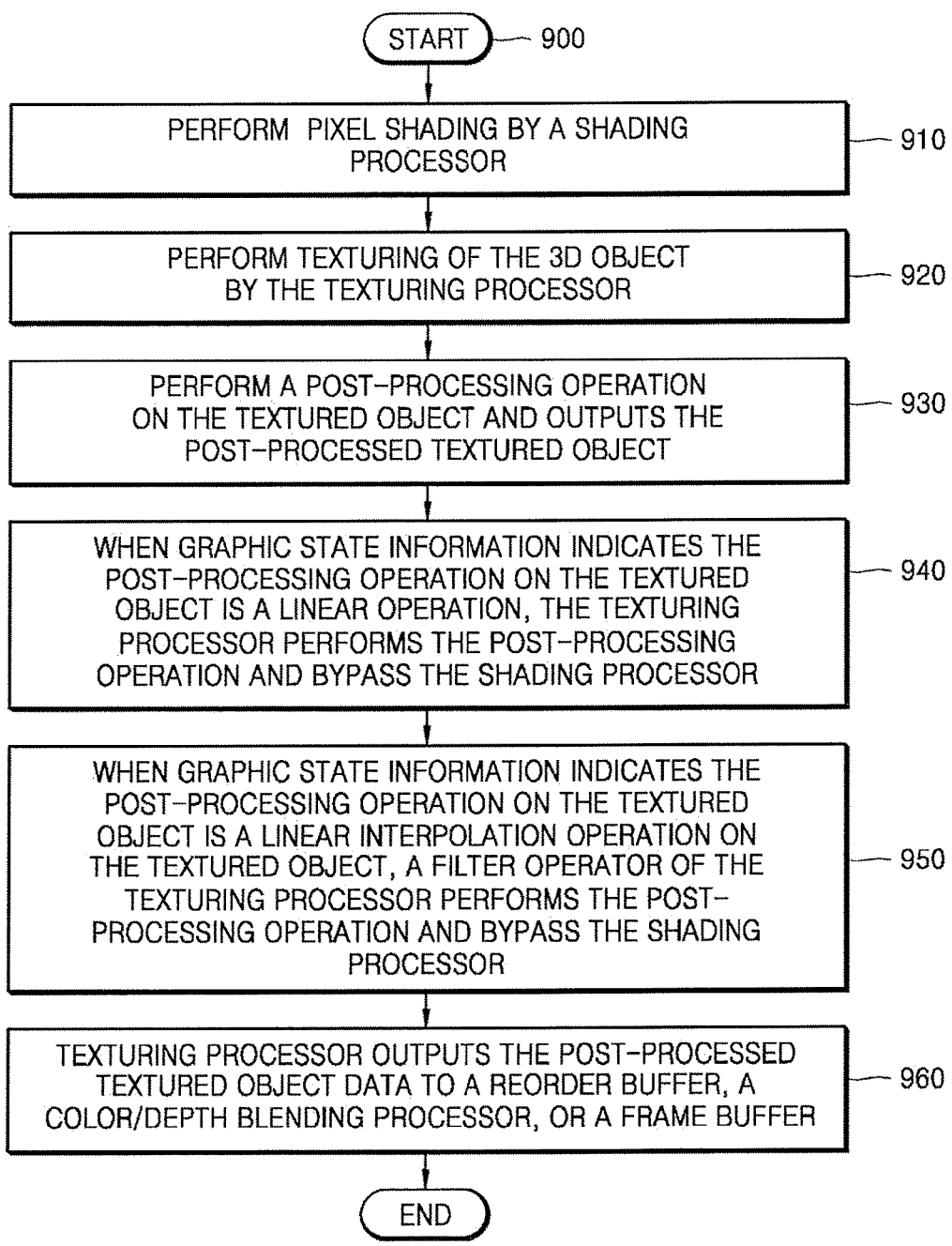
FIG. 9 is a flowchart explaining operation of a graphic processing apparatus according to the inventive concept.

FIG. 9 is a flowchart illustrating an operation of a graphic processing apparatus according to the inventive concept.

The graphic processing apparatus begins a pipeline operation at operation 900, In operation 910, pixel shading is performed by a shading processor. An artisan understands that generation of vertices, shading of the vertices, generating primitives, and rasterization occurred prior to the pixel shading.

In operation 920, the texturing processor performs texturing of the 3D object.

In operation 930, a post processing operation is performed on the textured object which is then output to another stage of the pipeline.

In operation 940, when graphic state information indicates that the post-processing operation on the textured object is a linear operation, the texturing processor performs the post-processing operation and bypasses the shading processor.

In operation 950, when graphic state information indicates the post-processing operation on the textured object is a linear interpolation operation, a filter operator of the texturing processor performs the post-processing operation and bypasses the shading processor.

In operation 960, the texturing processor outputs the post-processed textured object data to at least one of a reorder buffer, a color/depth processor, or a frame buffer. The operation then ends.

A person of ordinary skill in the art should appreciate that the filter operator of the texturing processor can perform linear interpolations on the textured object, which permits bypassing the sending of data to the shading processor for post-processing operations. Thus, a savings in computational resources, processing time, and power may result from the graphics processing apparatus and method of the inventive concept.

In addition, the above-described embodiments of the inventive concept may be embodied as executable code in the form of a program, and may be implemented in general-use digital computers that execute the programs using a computer-readable recording medium. The execution of a program may transform the general-use digital computer to a special purpose computer. Data used in the embodiments of the present inventive concept may be recorded on a computer-readable medium in a variety of ways. Examples of the computer-readable recording medium include magnetic storage media (e.g., ROM, floppy disks, hard disks, etc.) and optical recording media (e.g., CD-ROMs or DVDs, etc.).

It should be understood that embodiments of the inventive concept described herein should be considered in a descriptive sense only and not for purposes of limitation. Descriptions of one embodiment should typically be considered as available for in other embodiments.

While one or more embodiments of the inventive concept have been described with reference to the figures, a person of ordinary skill in the art should appreciate that various changes in form and details may be made therein without departing from the spirit and scope as defined by the following claims.

What is claimed is:

1. A graphics processing apparatus for processing a graphics pipeline comprising:
   a shading processor configured to perform pixel shading to process pixels corresponding to a three-dimensional (3D) object of a 3D image;
   a texturing processor configured to texture the object, determine a post-processing operation mode from among a plurality of post-processing operation modes to adjust visual effects of the textured object, and transmit data of the textured object to a processing path of a plurality of processing paths for the post-processing operation in accordance with the determined post-processing operation mode; and
   a reorder buffer configured to buffer data of the object in accordance with a processing order when the processing path for a post-processing operation bypasses the shading processor,
   wherein the plurality of processing paths partially overlap each other.

2. The graphics processing apparatus of claim 1, further comprising a graphic driver connected to the graphics pipeline via a bus, and
   wherein the texturing processor determines the post-processing operation mode according to graphic state information provided from the graphic driver that indicates the post-processing operation mode from among the plurality of post-processing operation modes.

3. The graphics processing apparatus of claim 2, wherein the graphic state information indicates whether the post-processing operation is to be performed by the shading processor or the texturing processor, and includes information indicating a type of the post-processing operation, and information indicating a result data path for transmitting result data of the post-processing operation when the texturing processor performs the post-processing operation.

4. The graphics processing apparatus of claim 2, wherein the texturing processor transmits the data of the textured object to the shading processor when based on the graphic state information the determined post-processing operation mode is a first mode in which the shading processor performs the post-processing operation.

5. The graphics processing apparatus of claim 2, further comprising a color/depth blending processor connected to the shading processor and the reorder buffer; and
   wherein the texturing processor transmits result data of the post-processing operation to the reorder buffer to buffer data for input to the color/depth blending processor via one of the plurality of processing paths that bypasses the shading processor upon determination that the post-processing operation mode is a second mode in which the texturing processor performs the post-processing operation based on the graphic state information and transmits result data of the post-processing operation to the color/depth blending processor.

6. The graphics processing apparatus of claim 2, wherein the texturing processor transmits result data of the post-processing operation to the reorder buffer to buffer data for input to a frame buffer bypassing the shading processor and a color/depth blending processor upon determination that the post-processing operation mode is a third mode in which the texturing processor performs the post-processing operation based on the graphic state information and transmits result data of the post-processing operation to the frame buffer.

7. The graphics processing apparatus of claim 6, wherein the reorder buffer buffers a result data of the post-processing operation received via a bypass until input data of the color/depth blending processor or the frame buffer is prepared.

8. The graphics processing apparatus of claim 1, wherein the texturing processor includes a texture filter implemented by the texturing processor to perform the post-processing operation when the processing path bypasses the shading processor.

9. A method of processing a graphics pipeline by a graphics processing apparatus, the method comprising:
   performing pixel shading to process pixels corresponding to a three-dimensional (3D) object of a 3D image, the pixel shading being performed by a shading processor;
   texturing the object, the texturing being performed by a texturing processor;
   determining a post-processing operation mode from among a plurality of post-processing operation modes to adjust visual effects of the textured object, the determining being performed by the texturing processor; and transmitting data of the textured object to a processing path of a plurality of processing paths for the post-processing operation in accordance with the determined post-processing operation mode, the transmitting data being performed by the texturing processor, wherein data of the object is buffered by a reorder buffer in accordance with a processing order when the processing path for the post-processing operation bypasses the shading processor, and wherein the plurality of processing paths partially overlap each other.

10. The method of claim 9, wherein the determining of the post-processing operation mode is performed based on graphic state information provided from a graphic driver indicating the post-processing operation mode from among the plurality of post-processing operation modes.

11. The method of claim 10, wherein the graphic state information indicates whether the post-processing operation is to be performed by the shading processor or the texturing processor, and includes information indicating a type of the post-processing operation, and information indicating a result data path for transmitting result data of the post-processing operation when the post-processing operation is performed by the texturing processor.

12. The method of claim 10, wherein the transmitting data of the textured object to the shading processor is performed in response to determining from the graphic state information that the post-processing operation mode is a first mode in which the shading processor performs the post-processing operation.

13. The method of claim 10, further comprising performing the post-processing operation by the texturing processor in response to determining from the graphic state information that the post-processing operation mode is a second mode, and transmitting a result data of the post-processing operation to a color/depth blending processor.

14. The method of claim 13, wherein the result data is transmitted to the color/depth blending processor via the reorder buffer to buffer input data of the color/depth blending processor and via a path bypassing the shading processor.

15. The method of claim 10, further comprising performing the post-processing operation by the texturing processor in response to determining from the graphic state information that the post-processing operation mode is a third mode, and transmitting a result data of the post-processing operation to a frame buffer based on the graphic state information, wherein the result data is transmitted to the frame buffer via the reorder buffer to buffer input data of the frame buffer and via a path bypassing the shading processor and a color/depth blending processor.

16. The method of claim 9, wherein a texture filter of the texturing processing performs the post-processing operation when the processing path bypasses the shading processor.

* * * * *